United States Patent [19]

Kaneko et al.

[11] Patent Number: 5,318,865
[45] Date of Patent: Jun. 7, 1994

[54] REDOX BATTERY

[75] Inventors: Hiroko Kaneko; Akira Negishi; Ken Nozaki, all of Tsukuba; Kanji Sato, Kashima; Masato Nakajima, Inashiki, all of Japan

[73] Assignees: Director-General, Agency of Industrial Science and Technology, Tokyo; Kashima-Kita Electric Power Corporation, Ibaraki, both of Japan

[21] Appl. No.: 892,032

[22] Filed: Jun. 2, 1992

[30] Foreign Application Priority Data

Jun. 6, 1991 [JP] Japan .................................. 3-134945

[51] Int. Cl.$^5$ .............................................. H01M 6/18
[52] U.S. Cl. ........................................ 429/193; 429/194; 429/196
[58] Field of Search ........................... 429/193, 194, 196

[56] References Cited

U.S. PATENT DOCUMENTS

| | | |
|---|---|---|
| 2,986,592 | 5/1961 | McCallum et al. . |
| 3,279,949 | 10/1966 | Schaefer et al. . |
| 3,279,949 | 10/1966 | Schaefer et al. . |
| 3,996,064 | 12/1976 | Thaller . |
| 4,362,791 | 12/1982 | Kaneko et al. . |
| 4,370,392 | 1/1983 | Savinell et al. . |
| 4,786,567 | 11/1988 | Skyllas-Kazacos et al. . |

FOREIGN PATENT DOCUMENTS

| | | |
|---|---|---|
| 1409588 | 7/1965 | France . |
| 2431196 | 2/1980 | France . |
| 90/03666 | 4/1990 | PCT Int'l Appl. . |
| WO89/05526 | 6/1989 | World Int. Prop. O. . |
| WO89/05528 | 6/1989 | World Int. Prop. O. . |

OTHER PUBLICATIONS

Chem Abstract An 114872, vol. 117, No. 2; Jul. 13, 1992.
Journal of Applied Electrochemistry, vol. 15, (1985) pp. 619–629, J. T. Kummer, et al., "A Chemically Regenerative Redox Fuel Cell. II".
Chemical Abstracts, AN 11487z, vol. 117, No. 2, Jul. 13, 1992, and JP-A-04019966, Jan. 23, 1992, p. 213, H. Kaneko, et al., "Redox-Flow Batteries".

*Primary Examiner*—Prince Willis, Jr.
*Assistant Examiner*—M. Nuzzolillo
*Attorney, Agent, or Firm*—Oblon, Spivak, McClelland, Maier & Neustadt

[57] ABSTRACT

In a redox battery including an electrolytic cell which has a circulating type electrolytic solution and an intermittent circulating type electrolytic solution which has a membrane and which employs an electrolytic solution permeable porous electrode, a solution of vanadium (II/III) dissolved in sulfuric acid is used as an active material on the negative electrode of a redox couple, and an oxidizing substance in a gas (such as oxygen) or in electrolytic solution is used as an active material on the positive electrode of the redox couple. The redox battery of the invention shows high energy density, and has a small size and a high output, thus it can be used for an electric vehicle or as a portable battery.

3 Claims, 8 Drawing Sheets

REDOX BATTERY

BACKGROUND OF THE INVENTION

1. Field of the Invention

This invention relates to a redox battery and, more particularly to a redox type secondary battery (hereinafter called redox battery) using a vanadium solution of reduction state and an oxidizing substance as a redox couple.

2. Description of the Invention

A redox flow type battery has active materials in electrolytic solution form and charging and discharging are carried out by the redox reaction, by circulating the active materials on positive and negative electrodes in a circulating type electrolytic cell and an intermittent circulating type solution having a membrane, and employing a solution permeable porous electrode. Compared to a conventional secondary battery, a redox flow type battery has the following advantages.

1) In order to increase the storage capacity, only the volume of the storing vessel needs to be increased. The amount of active materials, and, the electrolytic cell itself does not need to be changed unless it is desired to increase the output.

2) Since the active materials on the negative and positive electrodes can be completely separated and stored in each tank, the possibility of self-discharging is less than in those batteries where the active material is contacted with the electrode.

3) With the solution permeating type carbon porous electrode used in this battery the charging/discharging reaction of the active material ions (electrode reaction) is carried out only by exchanging the electrons on the electrode surface, and material is not deposited on the electrode, unlike zinc ions, thus the reaction of the battery is simple.

A redox flow type battery considered to be at a practical level of development at the moment, uses chromium (II, III) and iron (II, III) as a redox couple, and shows excellent performance depending on its use. In long term use, however, the battery has certain defects in that the iron and the chromium cannot be kept from mixing with each other through the membrane of the electrolytic cell resulting in both of the active materials becoming mixtures of iron and chromium. They are thus subject to the limitations of solubility and the concentration of each material cannot be maintained at a high level. Also, in the case of a chromium/iron type battery, the output voltage is around 0.9-1 volt per electric cell, the energy density of the cells (obtained by dividing the amount of energy which can be taken out by discharging, with the cell volume) becomes only around 30 watt hour/liter.

In order to mitigate these shortcomings, a redox flow type battery using chromium chlorine type redox couples, etc. has been suggested (Japanese Patent Laid-Open No. 61-24172), however, an electrolytic solution for a battery composed of an optimal redox couple has not yet been found as shown below.

With chromium, chlorine type redox couples, high concentrations of chloride ion are required since the chlorine is used as the active material. Also, a high concentration of hydrochloric acid is used in order to reduce the electric resistance of an ion exchange membrane used as the membrane, since a cation exchange membrane is chosen for migrating hydrogen ions. However, as the redox potentials of divalent and trivalent chromium ions are close to that of the hydrogen generating potential, the higher the acid concentration becomes, the more the side reaction of hydrogen gas generation is increased, resulting in a lowering of efficiency. Due to the coexistence of high concentration chloride ions, the solubility of chromium ions is decreased as well.

Use of halide acid solutions of iron, copper, tin, nickel and halogen, etc. as an active material to improve the electrode reaction at the positive and negative electrodes, has been suggested (Japanese Patent Laid-Open No. 60-207258), however, none of the combinations are quite satisfactory due to their low electromotive force per electric cell, or complex cell reaction of depositing a metal on the electrode.

Furthermore, an all-vanadium redox flow type battery (J. Electrochem. Soc., 133 1057 (1986), U.S. Pat. No. 4,786,567, using a redox ion couple of vanadium (IV, V) and vanadium (III, II) dissolved in sulforic acid solution as positive and negative electrolytes (J. Power Sources, 15 179, and 16 85 (1985)) has been proposed. However, since it uses expensive vanadyl sulfate, a means to provide inexpensive vanadium is required for the practical use of the technique.

In this context, a redox battery using vanadium ions (III, II) for the negative electrode and halogen or iron ions for the positive electrode has been invented (Japanese Patent Application No. 2-121764). Although the battery had an electromotive force which was comparable to that of an all-vanadium system, since halogen was used as the active material on the positive electrode, it has a problem of requiring a system for storing the active material.

According to U.S. Pat. No. 4,786,567, the electrolytic solution of vanadium is produced from vanadyl sulfate ($VOSO_4$), by dissolving it in sulfuric acid of 0.1–5 mol/liter (M) and the resulting solution having a vanadium concentration of 0.01–2.5M is used as the battery electrolyte. Since vanadyl sulfate is very expensive as already mentioned it is not suitable for a battery electrolyte to be used in large amounts.

The authors have already proposed a technique to produce a relatively inexpensive vanadium type electrolyte from a vanadium resource in petroleum combustion soot (U.S. Ser. No. 772,794), which is aimed at finding an inexpensive vanadium resource and utilizing a by-product from a Flue gas treatment process. It is therefore an object of the present invention to provide a redox battery having a small size, an improved energy density, and a high output, which can be used for an electric vehicle or as a portable battery, based on the above mentioned finding.

SUMMARY OF THE INVENTION

According to the invention, by using vanadium in a reduction state, preferably a sulfuric acid solution of vanadium (II, III) as a negative electrolyte, a gas permeable porous electrode with catalyst as a positive electrode, and sending an oxidizing substance, preferably air to the positive electrode to carry out the redox reaction, the resulting electromotive force is improved and the necessary amount of vanadium to be used is decreased compared with the conventional all-vanadium battery and a battery of high output and small size can be produced.

The redox battery of the present invention, thus comprises an electrolytic cell of an electrolytic solution circulating type and an electrolytic solution intermittently circulating type, having a membrane and employing an electrolytic solution permeable porous electrode, characterized in that a reducing vanadium solution dissolved in a polar solvent is used as an active material on a negative electrode, and an oxidizing substance in a gas or a solution is used as an active material on a positive electrode.

DESCRIPTION OF THE PREFERRED EMBODIMENT

Figure 1:
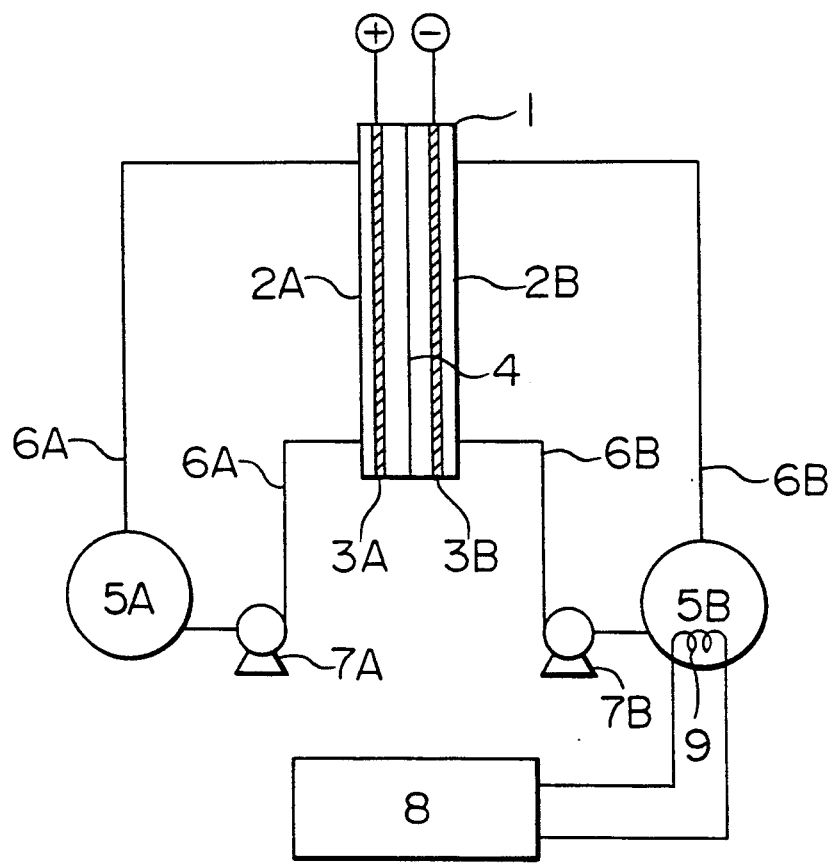
FIG. 1 is a schematic view of a redox battery (electric cell) of the invention.

In the redox battery of the invention, a reducing vanadium solution is sent to a negative electrode side separated by a membrane to carry out a reducing reaction on a solution permeable carbon porous electrode. The membrane can be made of any material as far as it has acid resistance and pores which can provide a difference in the diffusion state between vanadium ions and hydrogen ions. The material of the diaphragm may include ceramics, glass, resins and cation exchange resins.

On the positive electrode, the following reaction takes place.

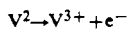

$$V^{2+} \rightarrow V^{3+} + e^-$$

The active material at the negative electrode is a reducing vanadium solution which is dissolved in a polar solvent, preferably it is a solution of divalent/trivalent vanadium. The high concentration vanadium solution which has previously been proposed by the present inventors (see Japanese Patent Application Nos. 2-273356 and 3-66608) is especially preferable.

As the active material at the positive electrode, an oxidizing substance in a gas or electrolytic solution may be used. Any substance, as far as it can receive electrons from the positive electrode, can be used, however, illustratively it may include such gases as air, oxygen, carbon monoxide, nitrogen monoxide, sulfur dioxide, carbon dioxide depending on the catalyst to be selected or such a solution as hydrogen peroxide. Among them, oxygen and air are preferable.

When oxygen or air is used as the active material on the positive electrode the oxygen is adsorbed on the catalyst, receives electrons from the electrode, and reacts with the protons in the electrolytic solution to produce water by the reaction on the electrode, as expressed in the following:

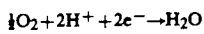

$$\tfrac{1}{2}O_2 + 2H^+ + 2e^- \rightarrow H_2O$$

Accordingly, the total equation can be expressed as:

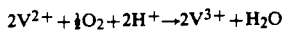

$$2V^{2+} + \tfrac{1}{2}O_2 + 2H^+ \rightarrow 2V^{3+} + H_2O$$

Referring to the positive electrode, an ion exchange membrane, such as a platinum supporting porous electrode used for a phosphoric acid type fuel battery, which is produced by binding carbon particles with polytetrafluoroethylene (trade designation: Teflon) sufficiently allows the electrolyte to penetrate it, and to carry out the above mentioned reaction on the three phase interface where the hydrogen ions in the electrolytic solutions, oxygen and the platinum catalyst on the electrode contact each other.

Recently, a metal-ferrocene catalyst having a very large oxygen absorption capacity has been found, and such catalyst can also be used for carrying out the above mentioned reaction.

By the use of air as the active material on the positive electrode, the amount of the vanadium to be used in the battery of the invention will be half of the amount used in the all vanadium redox flow battery, thus the cutting its weight in half as well.

As the active material on the positive electrode, nitrogen monoxide, carbon monoxide, sulfur dioxide, and carbon dioxide can be used as well, and the reaction can be carried out by selecting an appropriate catalyst on the electrode.

Referring now to FIG. 1, there is shown a schematic view of one example of a redox battery in accordance with the invention. The Figures show illustratively an electric cell main body 1, positive electrode, negative electrode end plates 2A and 2B, positive electrode 3A, negative electrode 3B, membrane 4, positive electrolyte tank 5A, negative electrolyte tank 5B, positive electrolyte, negative electrolyte lines 6A, 6B, positive electrolyte, negative electrolyte circulating pumps 7A, 7B, a heat exchanger to control the precipitation of the active material of the electrolyte 8, and a tube for heat exchanging solution of negative electrode side 9. When an oxidizing substance in a gas state, such as air, is used, 5A, 6A and 7A are not required.

In the redox battery of the invention, utilizing a platinum supporting carbon membrane binded with polytetrafluoroethylene as the positive electrode, carbon cloth as the negative electrode, a sulfuric acid solution dissolving vanadium sulfate (VSO$_4$) of 147 g/l as the active material on the negative electrode, and air as the active material on the positive electrode, the reactions at both electrodes can be expressed as follows:

| | Potential (V) |
|---|---|
| the negative electrode: | $3_N = -0.256$ |
| $V^{2+} \rightarrow V^{3+} + e^-$ | |
| at the positive electrode: | $E_P = 1.229$ |
| $\tfrac{1}{2}O_2 + 2H^+ + 2e^- \rightarrow H_2O$ | |
| Total reaction: | $\Delta E = 1.485$ |
| $2V^{2+} + \tfrac{1}{2}O_2 + 2H^+ \rightarrow H_2O + 2V^{3+}$ | |

Table I shows electromotive force, theoretical quantity of electricity, and theoretical energy density of the redox couple of the battery of the invention. The measurements of a well known lead acid battery are also shown in the table I as a reference.

The equation used for calculation is as follows:

| | |
|---|---|
| Molecular weight of the active material on negative electrode, VSO$_4$: | $M_W = 147$ g |
| Number of electrons involved in the reaction: | $n = 1$ |
| Theoretical quantity of electricity: | $Q_W = 96500\ n/M_W$ (Ah/kg) |
| Electromotive force: | $\Delta E = E_P - E_N$ |
| Theoretical energy density: | $E_W = \Delta E \times Q_W$ |

TABLE I

| Battery | E (V) | $Q_W$ (Ah/kg) | $E_W$ (Wh/Kg) |
|---|---|---|---|
| Battery of the invention | 1.485 | 182.4 | 270.9 |
| Lead acid battery | 2.0 | 120.1 | 240.2 |

The redox battery of the invention has better capacities in both theoretical quantity of electricity and theoretical energy density than a lead acid battery. Besides, it can also be used as a device to remove an oxidizing gas which can be reduced by the vanadium, such as nitrogen monoxide, carbon monoxide, sulfur dioxide or carbon dioxide, etc., in addition to its function as a battery.

Accordingly, with the redox battery of the invention, the following results can be achieved.

1) As a result of using air as the active material on the positive electrode, the resulting theoretical energy density can almost double that of the all-vanadium type redox flow battery and a battery of small size and high output can be achieved.

2) As a result of using air as the active material on the positive electrode, the amount of expensive vanadium to be used can be cut by half, compared with the all-vanadium type redox flow battery, enabling the production of a less expensive battery.

3) As a result of using air as the active material on the positive electrode, the cross mixing of ions through the membrane can be prevented so that there is thus little self-discharge.

4) Even when any of di, tri, tetra and penta valent vanadium ions precipitate during the electrode reaction, the temperature of the electrolyte can be controlled by providing a heat exchanger in a tank for crystallizing or dissolving the vanadium, and a large quantity of electricity can be stored.

5) By choosing an appropriate catalyst to be supported on the positive electrode, the battery can also be used as a device for removing an oxidizing gas such as nitrogen monoxide, carbon monoxide, sulfur dioxide, etc.

The active material solution used in the redox battery of the invention is not limited to an aqueous solution, and an organic polar solvent can also be used as a solvent without causing any problem to the constitution of the invention. The cell voltage can be designed to have a desired value by laminating thin type electric cells, in the same manner as iron, chromium type and all vanadium type redox batteries.

As is clear from the above description, according to the invention, a small sized, low weight redox battery having high charging/discharging Coulomb efficiency, causing little hydrogen generation, and showing no crossmixing of ions through the membrane can be provided by using a sulfuric acid solution of vanadium (II)/(III) as the active material on the negative electrode, air as the active material on the positive electrode, and by employing a gas permeable carbon porous electrode with a catalyst.

EXAMPLES

Examples of a series of charging and discharging experiments using the redox battery of the invention will be described as follows.

Figure 2:
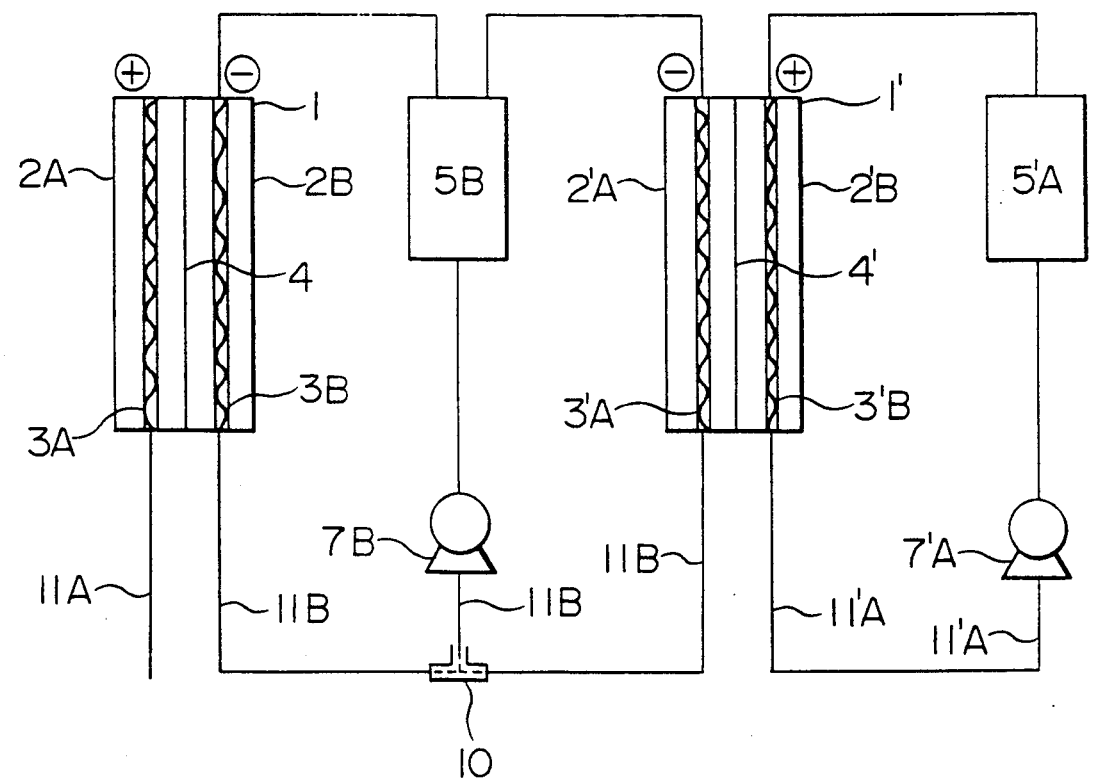
FIG. 2 is a schematic view of a battery where two units of redox battery (electric cells) of the invention are coupled.
Figure 3:
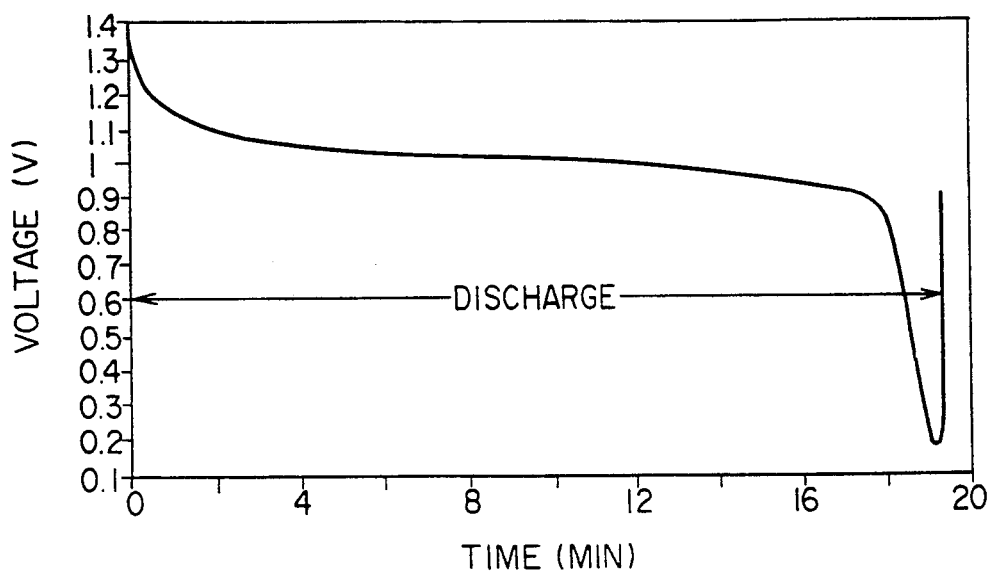
FIGS. 3–14 are graphs which depict charging/discharging curves of the redox batteries of the invention.
Figure 4:
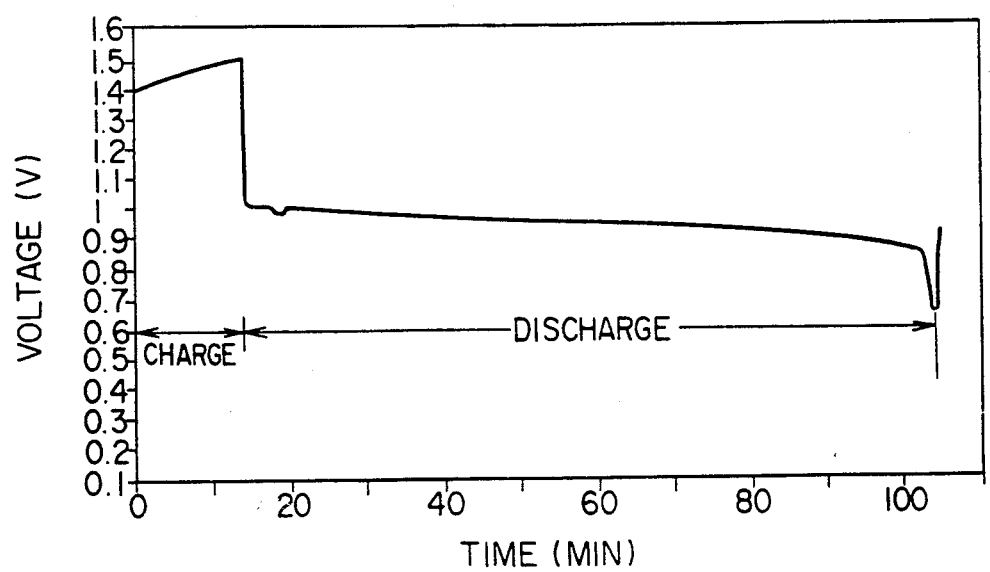
Figure 5:
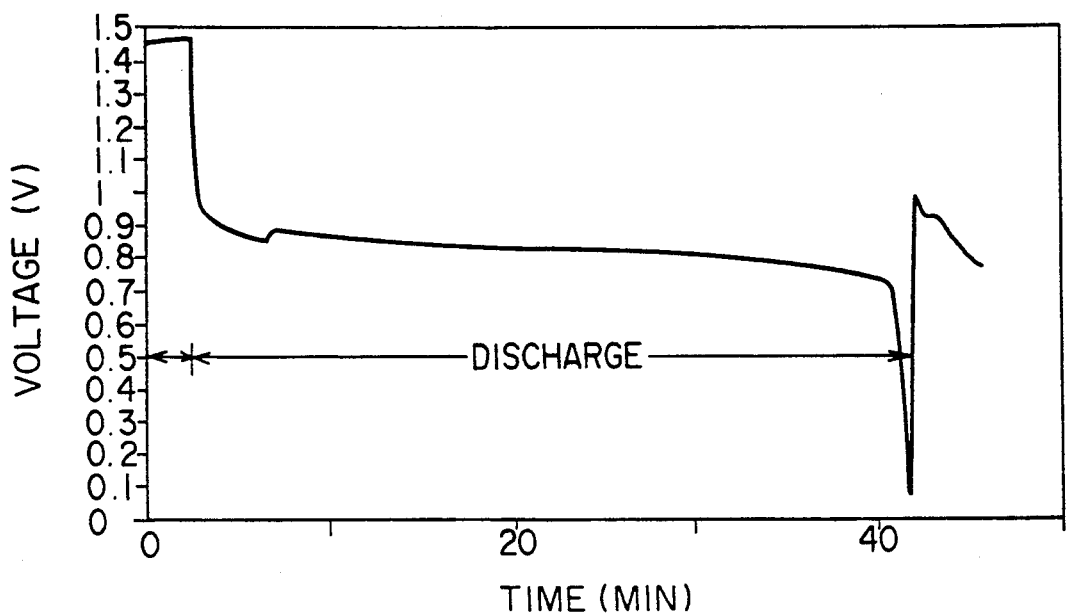
Figure 6:
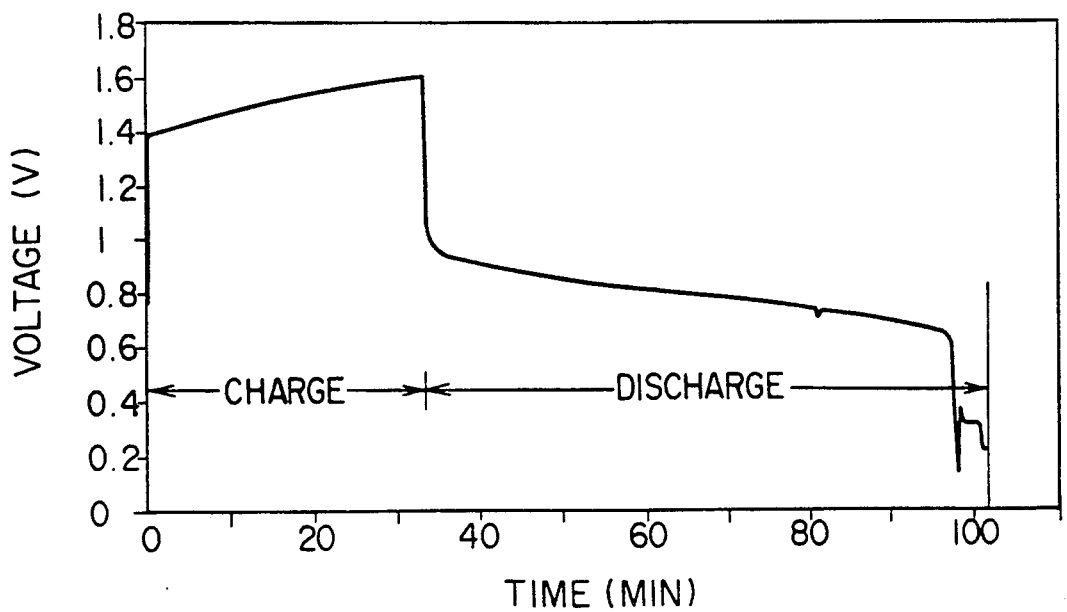

Referring now to FIG. 2, there is shown a schematic view of a device used in the following examples 1-3. The device is essentially made of two redox battery shown in FIG. 1.

The figure shows electric battery main bodies 1, 1'; negative electrode end plates 2A, 2'B; negative electrode end plates 2B, 2'A; positive electrode 3A, 3'B; negative electrode 3B, 3'A; membrane 4, 4'; positive electrolyte tank 5'A; negative electrolyte tank 5B; positive electrolyte and negative electrolyte lines 6'A, 6B; positive electrolyte, negative electrolyte circulating pumps 7'A, 7B; switching cock 10; air and oxygen gas introducing line 11A; positive electrolyte and sulfuric acid solution line 11A'; and negative electrolyte line 11B.

EXPERIMENTAL EXAMPLE 1

0.1 g of chloroplatinic acid was dissolved in 10 ml of distilled water and the resulting 4 ml solution was absorbed by carbon paper (commercially available from Toray Industries Inc.) having a surface area of 10 cm$^2$, then it was dried at 100° C. and reduced at 100° C. in methanol vapor, to produce a platinum supporting carbon electrode. The produced platinum supporting carbon electrode was used as anode (3A) of the vanadium-oxygen type redox battery shown in FIG. 2, and carbon cloth having an apparent surface area of 10 cm$^2$ (commercially available from Toyobo Co., Ltd. under the trade designation: BM-309) was used for other electrodes (3'A, 3B, 3'B). 1 mol/l (M) vanadium (IV) solution of 4 mol/l (M) sulfuric acid was circulated to the positive electrode chamber of vanadium-vanadium type redox battery and 1M vanadium (III) solution of 4M sulfuric acid was circulated to negative electrode chamber respectively at the flow rate of 5 ml/min, to carry out charging, then after the charging was completed, the produced vanadium (II) solution was circulated to cathode (3B) of vanadium-oxygen type redox battery by switching the clock (10) to carry out constant-current discharge. The charging current density, the discharging current density and the electrolyte temperature employed are shown in the Table II, Table II also shows the results of the charging/discharging reactions. The charging/discharging curves of the experiments No. 1–4 in the experimental example 1 are shown in FIGS. 3–6.

TABLE II

| | Experiment No. | | | |
|---|---|---|---|---|
| | No. 1 | No. 2 | No. 3 | No. 4 |
| Charging current density (mA/cm$^2$) | 20 | 60 | 60 | 60 |
| Discharging current density (mA/cm$^2$) | 2 | 5 | 10 | 10 |
| Ambient temperature (°C.) | 25 | 25 | 25 | 40 |
| Current efficiency (%) | 19.3 | 54.5 | 78.8 | 76.0 |
| Power efficiency (%) | 13.3 | 34.8 | 44.7 | 40.1 |
| Voltage efficiency (%) | 68.9 | 63.8 | 56.7 | 52.8 |

Experimental Example 2

Figure 7:
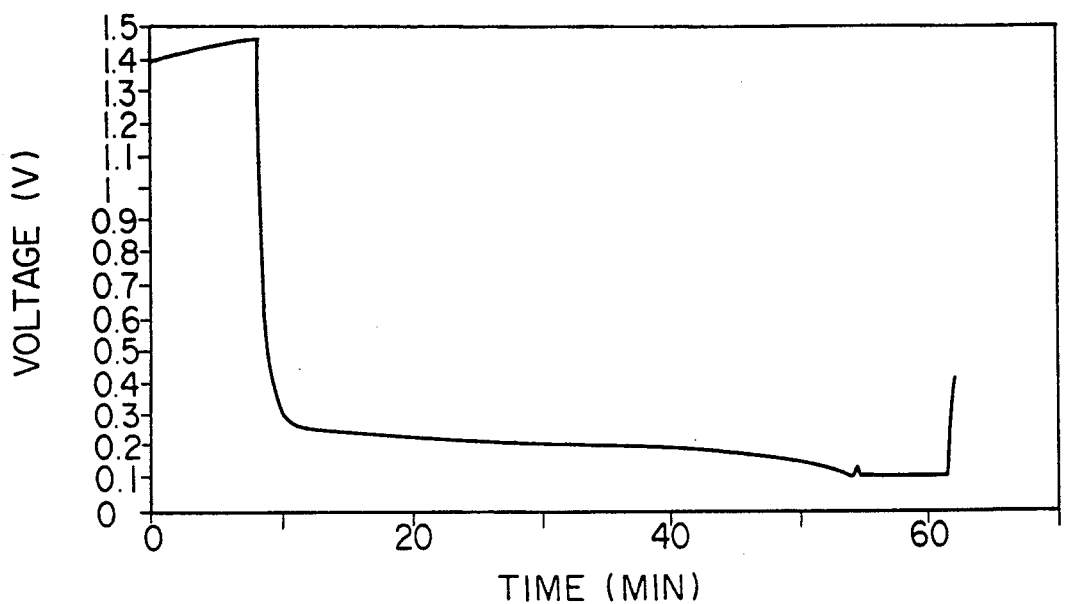
Figure 8:
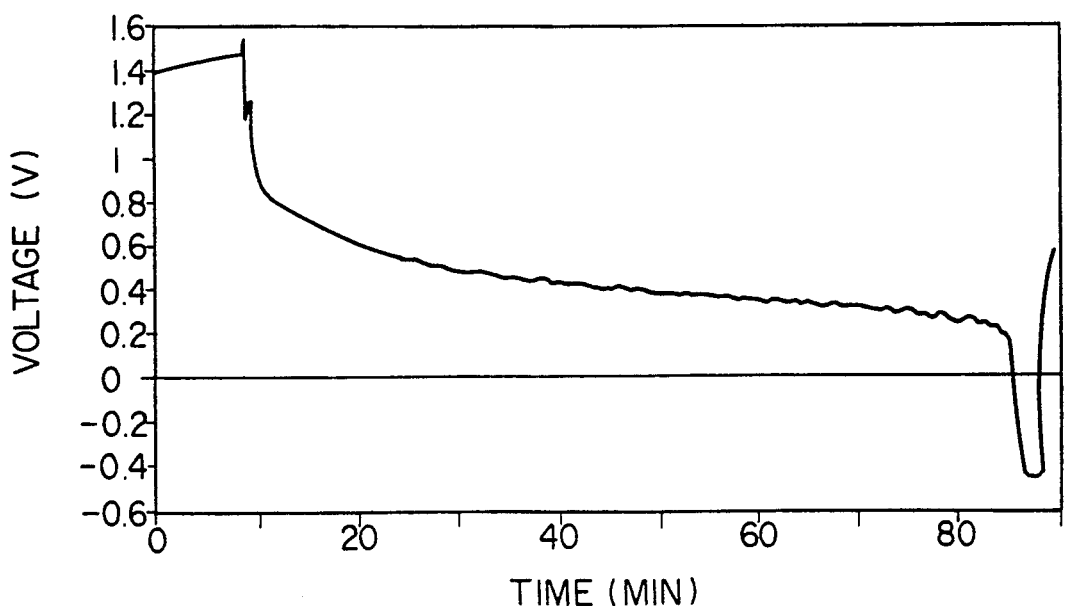
Figure 9:
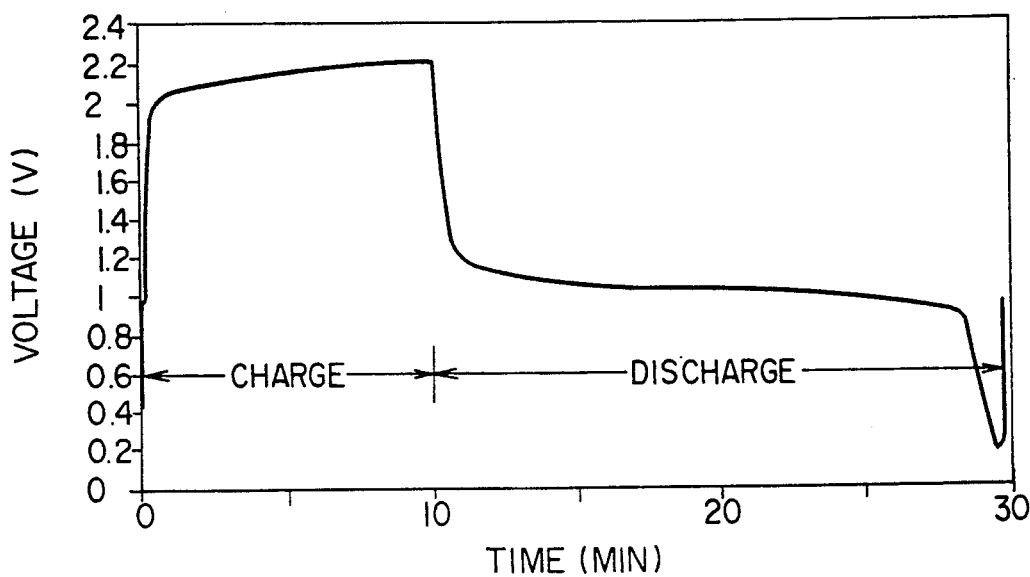
Figure 10:
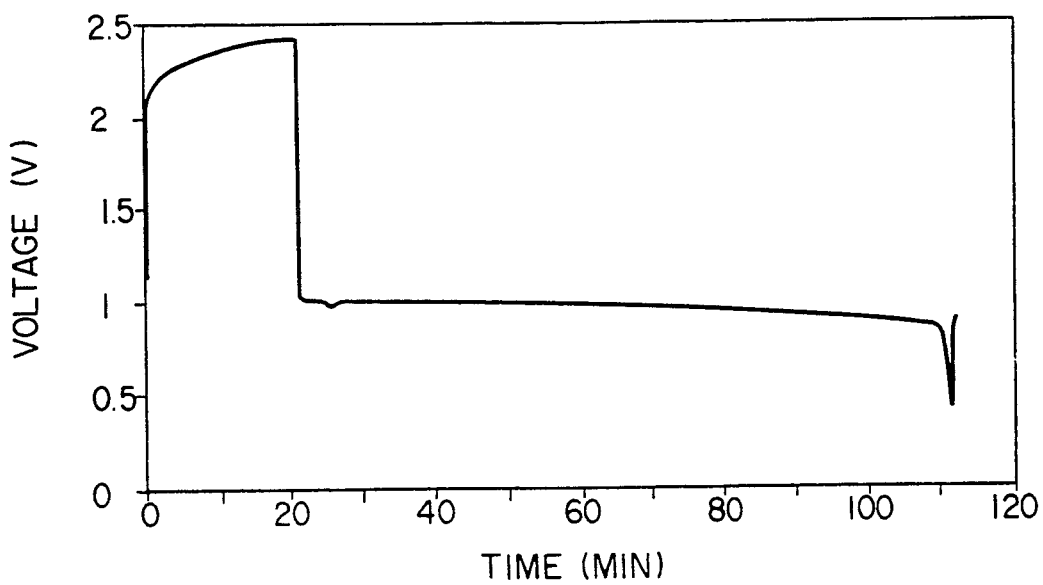
Figure 11:
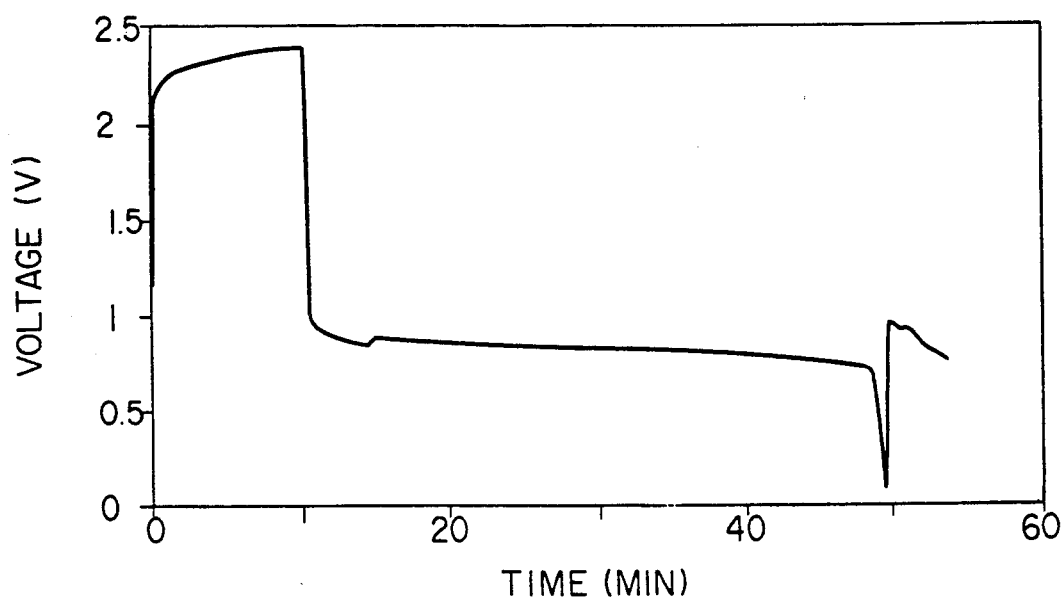
Figure 12:
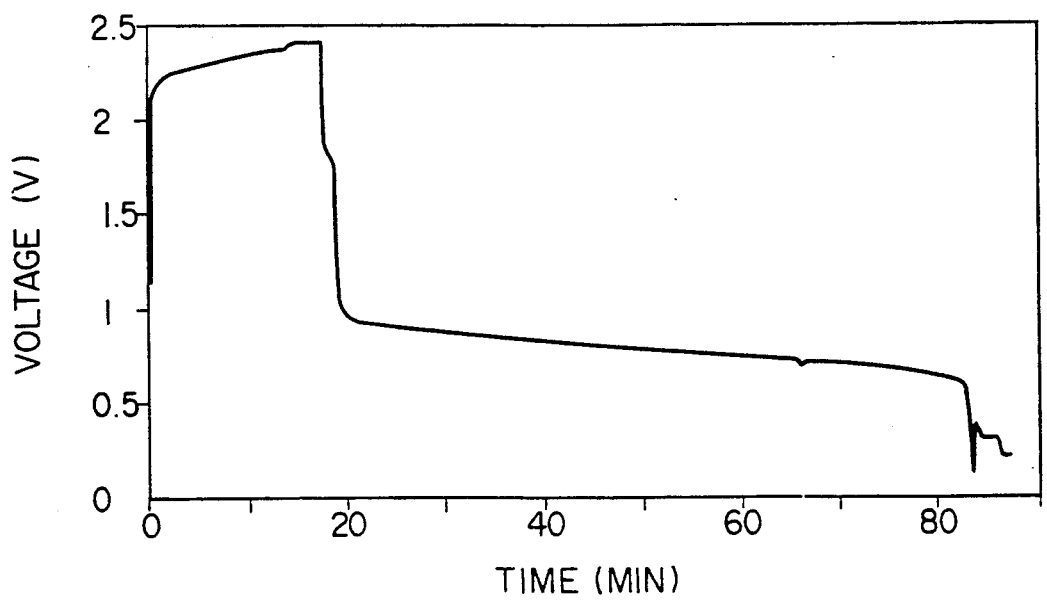

A small amount of a nonion type surfactant was added to the same chloroplatinic acid solution used in experimental example 1, and it was carefully coated on one side of a polytetrafluoroethylene type ion exchange membrane (commercially available from Du Pont under the trade designation: Nafion N117) and polysulfone type ion exchange membrane (commercially available from Asahi Glass Co., Ltd under the trade designation: AM-1), then the chloroplatinic acid was reduced in methanol vapor at 110° C. to produce positive electrode (3A). The positive electrode was so mounted in a cell that the surface with the platinum catalyst faces to the oxygen side, and carbon cloth was attached to the other side of the electrode where the platinum was not supported, and carbon cloth having an apparent surface area of 10 cm² was used as the negative electrode (3B) to carry out contact-current discharge in the same manner as in experimental example 1. The charging current density, the discharging current density and the electrolyte temperature employed are shown in Table III. Table III also shows the results of the charging/discharging reactions. The charging/discharging curves of experiments No. 1 and 2 in experimental example 2 are shown in FIGS. 7 and 8.

TABLE III

|  | Experiment No. | |
|---|---|---|
|  | No. 1 | No. 2 |
| Charging current density (mA/cm²) | 60 | 60 |
| Discharging current density (mA/cm² | 10 | 5 |
| Ambient temperature (°C.) | 25 | 25 |
| Ion exchange membrane | Nafion N117 | AM-1 |
| Current efficiency (%) | 97.1 | 79.6 |
| Power efficiency (%) | 13.7 | 24.4 |
| Voltage efficiency (%) | 14.1 | 30.7 |

Experimental Example 3

0.1 g of phthalocyanine cobalt (reagent commercially available from Tokyo Kasei Co., Ltd.) was mixed with 0.5 ml of a fluorocoating agent (commercially available from Sumitomo 3M Limited under the trade designation: FLURAD) and this was impregnated and supported on carbon paper (commercially available from Toray Industries Inc.). The charging and discharging experiments were done in the same manner as in experimental example 1. After constant-current charge was carried out at 150 mA for 10 mins, an open-circuit voltage and a short-circuit current between both terminals were measured. They were 1 volt and 10 mA respectively.

Experimental Example 4

In this experiment, the device shown in the FIG. 1 was used. A carbon electrode with platinum catalyst was mounted as positive electrode (3A), a carbon cloth was mounted as negative electrode (3B) in the same manner as in experimental example 1, and a polysulfone type ion exchange membrane (commercially available from Asahi Glass Co., Ltd. under the trade designation: AM-1) was used as the membrane. 1M vanadium (III) 4M sulfuric acid solution was circulated to the negative electrode chamber, and 4M sulfuric acid solution was circulated to the positive electrode chamber to carry out charging, and after the charging was completed, oxygen moistured with sulfuric acid solution was circulated to the positive electrode chamber at the flow rate of 300 ml/min to carry out discharge. The charging current density, the discharging current density and the electrolyte temperature employed are shown in Table IV. Table IV also shows the results of the charging/discharging reactions. The charging/discharging curves of experiments No. 1–4 in experimental example 4 are shown in the FIGS. 9–12.

TABLE IV

|  | Experiment No. | | | |
|---|---|---|---|---|
|  | No. 1 | No. 2 | No. 3 | No. 4 |
| Charging current density (mA/cm²) | 20 | 40 | 50 | 50 |
| Discharging current density (mA/cm²) | 2 | 5 | 10 | 10 |
| Ambient temperature (°C.) | 25 | 25 | 25 | 40 |
| Current efficiency (%) | 19.3 | 54.5 | 78.8 | 76.0 |
| Power efficiency (%) | 8.9 | 21.8 | 27.4 | 25.1 |
| Voltage efficiency (%) | 45.9 | 40.0 | 34.9 | 33.1 |

Experimental Example 5

Figure 13:
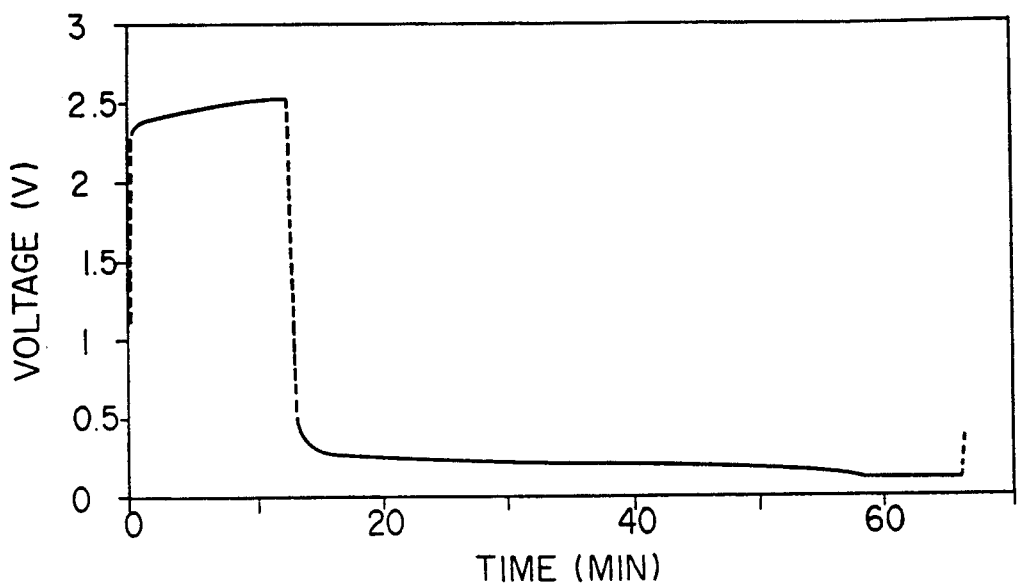
Figure 14:
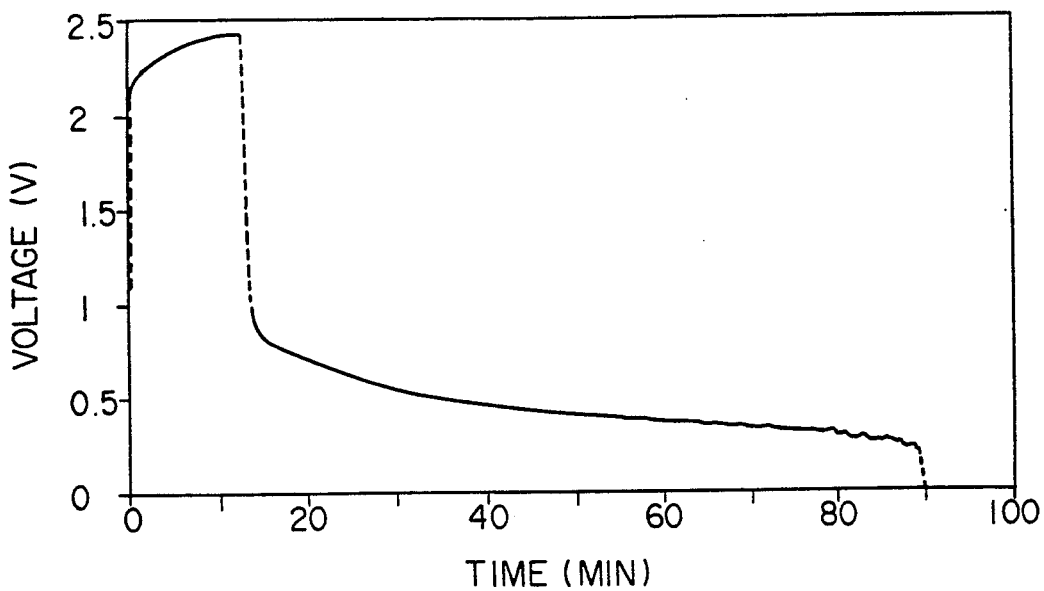

A positive electrode made of polytetrafluoroethylene (commercially available from Du Pont under the trade designation: Nafion N117), or polysulfone type ion exchange membrane (commercially available from Asahi Glass Co., Ltd, under the trade designation: AM-1) supported platinum on one of its surfaces in the same way as in experimental example 2, was mounted in the device of FIG. 1, so that the platinum supporting surface faced the oxygen side, and constant-current discharge experiments were carried out in the same way as in experimental example 2. The charging current density, the discharging current density and the electrolyte temperature employed are shown in Table V. Table V also shows the results of the charging/discharging reactions. The charging/discharging curves of experiments No. 1 and 2 in experimental example 5 are shown in the FIGS. 13 and 14.

TABLE V

|  | Experiment No. | |
|---|---|---|
|  | No. 1 | No. 2 |
| Charging current density (mA/cm²) | 40 | 40 |
| Discharging current density (mA/cm²) | 10 | 5 |
| Ambient temperature (°C.) | 25 | 25 |
| Ion exchange membrane | Nafion N117 | AM-1 |
| Current efficiency (%) | 97.0 | 77.7 |
| Power efficiency (%) | 8.7 | 15.7 |
| Voltage efficiency (%) | 8.3 | 20.0 |

We claim:

1. A redox battery, comprising:
an electrolytic cell including a flow electrolytic solution, an intermittent circulating electrolytic solution, and a membrane, and which employs an electrolytic solution permeable porous electrode,
wherein a solution of reducing vanadium dissolved in a polar solvent is used as an active material on a negative electrode of a redox couple, an oxidizing substance in a gaseous or electrolytic solution state is used as an active material on a positive electrode of the redox couple.

2. The redox battery of claim 1 characterized in that the vanadium solution is a solution of divalent/trivalent vanadium, and the oxidizing substance is oxygen or air.

3. The redox battery of claim 1 or claim 2 characterized in that a gas permeable carbon porous electrode with platinum or a metal phthalocyanine as a catalyst is used as the positive electrode.

* * * * *